United States Patent Office 3,398,190
Patented Aug. 20, 1968

---

3,398,190
FLUORO-DICHLORO-METHANE-SULFENIC ACID-N-(TRIFLUORMETHYL)-N-ANILIDE
Paul-Ernst Frohberger, Burscheid, Bezirk, Dusseldorf, Erich Klauke, Cologne-Flittard, and Engelbert Kühle, Bergisch-Gladbach, Germany, assignors to Farbenfabriken Bayer Aktiengesellschaft, Leverkusen, Germany, a corporation of Germany
No Drawing. Filed Nov. 5, 1965, Ser. No. 506,610
Claims priority, application Germany, Nov. 17, 1964, F 44,460
1 Claim. (Cl. 260—551)

The present invention relates to a particular new fluoro-dichloromethane-sulfenic acid-N-(trifluoromethyl)-N-anilide, which has fungitoxic properties, to its compositions with carrier vehicles, and to processes for the production and use thereof.

It has been disclosed previously that N-trifluoromethylated sulfenamides can be used as fugicides in plant protection. These sulfenamides are obtained by reacting N-trifluoromethyl-arylamines with sulfenic acid halides in the presence of tertiary amines as acid-binding agents (cf. German Patent No. 1,161,262).

It is an object of the present invention to provide a particular new fluoro-dichloromethane-sulfenic acid N-(trifluoromethyl)-N-anilide which possesses valuable fungitoxic and/or fungicidal properties, to provide active compositions in the form of mixtures of such compound with solid and liquid dispersible carrier vehicles, to provide a process for producing such compound, and to provide a method of using such compound, in a new way, especially for combating fungi and especially seed-propagated fungi and fungi living in the soil.

Other and further objects of the present invention will become apparent from a study of the within specification and accompanying examples.

It has been found in accordance with the present invention that the particular new fluoro-dichloromethane-sulfenic acid - N-(trifluoromethyl)-N-(2-methyl-5-nitro)-anilide compound having the formula:

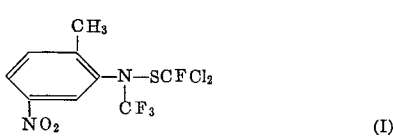

(I)

has strong fungitoxic properties.

This new sulfenic acid derivative of general Formula I can be obtained by reacting N-trifluoromethyl-(2-methyl-5-nitro)-aniline with fluoro-dichloromethane-sulfenyl chloride in the presence of a tertiary amine as acid binding agent.

The new sulfenic acid derivative according to the present invention has, surprisingly, a substantially higher fungitoxic activity than the analogous sulfenic acid derivatives previously known, which are chemically the most closely related active compounds with the same type of activity. The new compound according to the present invention is, therefore, a valuable addition to the art.

The course of the reaction according to the present invention can be illustrated by the following equation whereby hydrogen chloride splitting-off takes place:

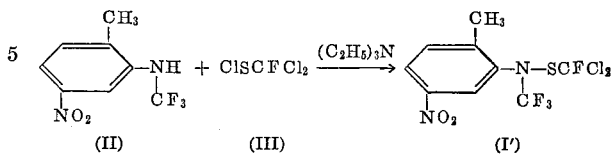

(II)        (III)                              (I')

The compounds required as starting materials for the above reaction are known, as the artisan will appreciate.

Suitably, the reaction can be carried out in the presence of typical inert organic diluents. These mainly include hydrocarbons such as benzine, toluene and benzene, ethers, such as diethyl ether and dioxan, and also ketones, such as dimethyl ketone.

Tertiary amines, such as trimethylamine, triethylamine and pyridine, are used as acid-binding agents.

The reaction temperatures may be varied within a fairly wide range. In general, the operation is carried out substantially between about 0 and 80° C., preferably between about 10 and 50° C.

To carry out the instant production process, 1 mol of the sulfenyl chloride is expediently used per mol aniline. The reaction can be performed, for example, by dissolving the two starting compounds in an inert solvent and slowly adding the acid-binding agent. Working up is carried out in the usual manner, for example, by filtering off the amine hydrochloride formed and concentrating the filtrate by evaporation in a vacuum.

Advantageously, the sulfenic acid derivative according to the present invention has a strong fungitoxic activity. Due to its low toxicity towards warm-blooded animals, it is eminently suitable for combating undesired fungus growth. The good compatibility of the instant compound with higher plants enables it to be used as a very useful plant protective agent against fungus diseases. It is especially suitable when utilized as seed dressing and fungitoxic soil treating agent.

The new active compound according to the present invention has a particularly good effect against, for example, seed-propagated fungi, such as *Fusarium nivale* and Helminthosporium, and fungi living in the soil, such as Fusarium species.

Thus, the new compound of the instant invention can be used as a fungicide either alone or in admixture with solid and liquid carriers or diluents.

The active compound according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granules, etc. These are prepared in known manner, for instance by extending the active agents with dispersible liquid diluent carriers and/or dispersible solid carriers optionally with the use of carrier vehicle assistants including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amines (for instance, ethanolamine, etc.), amides (for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and synthetic ground minerals (for instance, highly dispersed silicic acid, silicates, e.g., alkali silicates, etc.); whereas the following may be chiefly considered for use as carrier vehicle assistants for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compound according to the instant invention may be present in such formulations or compositions in the form of mixtures with more than one carrier and with other known active substances, if desired.

The substance according to the invention may be employed by itself as the artisan will appreciate, in the form of its compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for soil application generally contemplate those in which the active compound is present in an amount substantially between about 0.001 and 5.0%, preferably 0.01 and 2.5%, by weight of the mixture. Thus, the present invention contemplates overall compositions which comprise mixtures of a dispersible carrier vehicle such as a dispersible carrier solid, or a dispersible carrier liquid preferably including a carrier vehicle assistant such as an emulsifying agent and/or a dispersing agent, and an amount of the active compound which is effective for the purpose in question and which is generally between about 0.001 and 95%, and particularly 0.01–50%, by weight of the mixture. Moreover, the active compound may be applied as a seed dressing in a concentration which is generally substantially between about 0.1–100%, i.e., even in substantially pure form without any carrier, and preferably substantially between about 5–50%, by weight of the mixture with the carrier, the amount of the active compound and/or mixture with the carrier vehicle used as seed dressing generally being in the range of substantially between about 0.1–50 grams per kilogram of seed being dressed. In the same way, the active compound may be applied to soil in an amount of substantially between about 1–1000, and preferably 10–500, grams per cubic meter of soil.

Furthermore, the present invention contemplates methods of combating fungi, especially fungus growth on agricultural seeds or fungus growth in soil, which comprise applying to at least one of (a) such fungi and (b) their habitat, e.g., such seeds and/or such soil, a fungicidally effective amount of the particular active compound of the invention alone or together with a carrier vehicle as noted above. The instant formulations or compositions, and even the particular compound per se, may be applied in the usual manner, for example, by spraying, atomizing, vaporizing, scattering, dusting, sprinkling, pouring, and the like. In particular, where the active compound is used as seed dressing, it can be applied as a dry dressing, moist dressing, wet dressing, or slurry dressing. All in all, the concentration of the active compound may vary widely with the type of application intended, especially considering the use of the compound alone or in admixture with a carrier vehicle, for example as an agricultural seed dressing or as an additive incorporated in agricultural soil, especially prior to seeding of the soil.

The following examples are given for the purpose of illustrating, while not limiting, the utility of the new compound according to the present invention:

Example 1.—Seed dressing test/snow mold (seed-borne mycosis)

To produce a suitable dry dressing, the particular active compound is extended with a mixture of equal parts by weight of talc and kieselguhr to give a finely powdered mixture having the desired concentration of the given active compound.

To apply the dressing, rye seed which is naturally infested by *Fusarium nivale*, is shaken with the dressing in a closed glass flask. Two batches of 100 grains of this seed are sown 1 cm. deep in seed boxes containing Fruhstorfer standard soil. The young plants develop in climatic chambers at 10° C., at a relative atmospheric humidity of 95% and in diffused natural light; they show the typical symptoms of snow mold within the first three weeks.

After this time, the number of Fusarium-infested plants is determined percentagewise based on the total number of emerged plants. The smaller the number of diseased plants, the more effective is the particular active compound used.

The active compounds, their concentrations in the dressing, the amount of dressing used and the number of diseased plants can be seen from Table 1 which follows:

TABLE 1.—SEED DRESSING TEST/SNOW MOLD

| Active compound | Concentration of active comp. in dressing, percent | Amount of dressing applied, g./kg. seed | Number of Fusarium-infested plants in percent of total of emerged plants |
| --- | --- | --- | --- |
| Untreated | | | 11.3 |
| 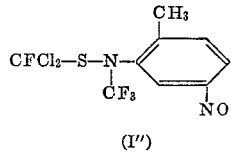 (I″) | 10 | 2 | 1.4 |
| | 30 | 2 | 1.0 |
| 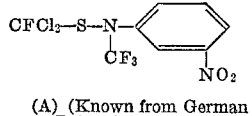 (A) (Known from German Patent No. 1,161,262) | 30 | 2 | 3.7 |

Example 2.—Seed dressing test/stripe disease of barley (seed-borne mycosis)

To produce a suitable dry dressing, the particular active compound is extended with a mixture of equal parts by weight of talc and kieselguhr to give a finely powdered mixture having the desired concentration of the given active compound.

To apply the dressing, barley seed, which is naturally infested by *Helminthosporium gramineum*, is shaken with the dressing in a closed glass flask. The seed is placed on moist filter paper discs in closed Petri dishes and kept in a refrigerator at a temperature of 4° C. for 10 days. The germination of the barley, and possibly also of the fungus spores, is thereby initiated. Two batches of 50 grains of the pre-germinated barley are subsequently sown 2 cm. deep in Fruhstorfer standard soil and cultivated in a greenhouse at temperatures of about 18° C. in seed boxes which are exposed to light for 16 hours daily. The typical symptoms of the stripe disease develop within 3 to 4 weeks.

After this time, the number of diseased plants is determined percentagewise based on the total number of emerged plants. The fewer the plants that are diseased, the more effective is the given active compound.

The active compounds, their concentration in the dressing, the amount of dressing used, and the number of diseased plants can be seen from Table 2 as follows:

TABLE 2.—SEED DRESSING TEST/STRIPE DISEASE OF BARLEY

| Active compound | Concentration of active comp. in dressing, percent | Amount of dressing applied, g./kg. seed | Number of plants affected by stripe disease in percent of total of emerged plants |
|---|---|---|---|
| Untreated | | | 35.8 |
| 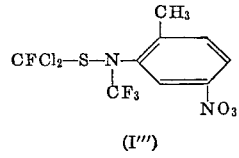 (I''') | 30 | 2 | 0.0 |
| 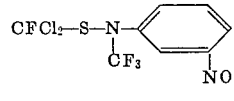 (A') (Known from German Patent No. 1,161,262) | 30 | 2 | 1.1 |

Example 3.—Soil treating agent test/soil-borne mycoses

To produce a suitable preparation of the particular active compound, the active compound is extended with talc to a content of 5% and subsequently with quartz sand to a content of 0.5% of the given active compound.

The preparation of the active material is homogeneously mixed with Fruhstorfer standard soil, which has first been sterilized and then inoculated with pure cultures of the test fungus. The soil is filled into five pots, each of which is sown with 10 seeds of the chosen host plants. The pots are placed in a greenhouse at the stated temperature and kept normally moist.

Three weeks after sowing, the number of healthy plants is determined as a percentage of seeds sown. 0% indicates that no healthy plants have grown, whereas 100% indicates that healthy plants have resulted from all the seeds.

The active compounds, their concentration in the soil, the test fungus, type of soil, host plant, greenhouse temperature and the results obtained can be seen from the following Table 3:

TABLE 3.—SOIL TREATING AGENT TEST/SOIL-BORNE MYCOSES

Test fungi: *Fusarium culmorum*
Type of soil: Standard soil
Host plant: Peas
Temperature range: 22-25° C.

| Active compound | Concentration of active comp. in mg./litre soil | Number of healthy plants, in percent |
|---|---|---|
| Fruhstorfer standard soil sterilized, untreated | | 85 |
| Fruhstorfer standard soil sterilized and inoculated, untreated | | 30 |
| 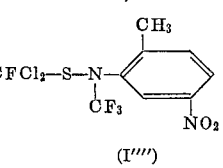 (I'''') | 100 | 90 |
| 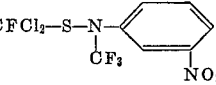 (A'') (Known from German Patent No. 1,161,262) | 100 | 40 |

The following example is given for the purpose of illustrating, while not limiting, the production of the new compound according to the present invention.

Example 4

2492 g. of 2-methyl-5-nitro-N-(trifluoromethyl)-aniline and 1950 g. of fluoro-dichloromethane-sulfenyl chloride are dissolved in 3 litres of benzene and mixed dropwise at room temperature with 1250 g. of triethyl-amine, while cooling with water. The temperature rises to about 45° C. Stirring is continued for some time, the cold mixture is filtered off with suction from the separated triethylamine hydrochloride, and the filtrate is concentrated by evaporation in a vacuum. 3639 g. (96% of the theoretical) of fluoro-dichloromethane-sulfenic acid-N-(trifluoromethyl)-N-(2-methyl-5-nitro)-anilide are thus obtained in the form of a viscous oil.

*Analysis.*—Calculated: N, 7.96; S, 9.11; Cl, 20.25. Found: N, 8.24; S, 8.80; Cl, 19.20.

It will be appreciated that the instant specification and examples are set forth by way of illustration and not limitation, and that various modifications and changes may be made without departing from the spirit and scope of the present invention which is to be limited only by the scope of the appended claim.

What is claimed is:
1. Fluoro-dichloromethane-sulfenic acid-N - (trifluoromethyl)-N-(2-methyl-5-nitro)-anilide having the formula

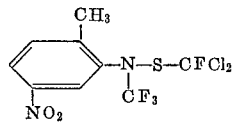

References Cited

UNITED STATES PATENTS 3,236,842  2/1966  Klauke et al. _____ 260—551 X

JOHN D. RANDOLPH, *Primary Examiner.*

H. I. MOATZ, *Assistant Examiner.*